United States Patent [19]

Best

[11] 4,433,207

[45] Feb. 21, 1984

[54] CRYPTOGRAPHIC DECODER FOR COMPUTER PROGRAMS

[76] Inventor: Robert M. Best, 16016 Ninth Ave. Northeast, Seattle, Wash. 98155

[21] Appl. No.: 300,797

[22] Filed: Sep. 10, 1981

[51] Int. Cl.³ .............................................. H04L 9/00
[52] U.S. Cl. .............................. 178/22.09; 178/22.08
[58] Field of Search .............. 178/22.09, 22.05, 22.08, 178/22.17; 364/200, 900

[56] References Cited

U.S. PATENT DOCUMENTS

| | | | |
|---|---|---|---|
| 3,906,460 | 9/1975 | Halpern | 178/22.09 |
| 4,028,678 | 6/1977 | Moran | 340/172.5 |
| 4,120,030 | 10/1978 | Johnstone | 364/200 |
| 4,168,396 | 9/1979 | Best | 178/22.09 |
| 4,206,315 | 6/1980 | Matayas et al. | 178/22.08 |
| 4,264,782 | 4/1981 | Konheim | 178/22.08 |
| 4,278,837 | 7/1981 | Best | 178/22.09 |
| 4,281,215 | 7/1981 | Atalla | 178/22.08 |
| 4,306,289 | 12/1981 | Lumley | 364/200 |
| 4,319,079 | 3/1982 | Best | 178/22.09 |
| 4,323,921 | 4/1982 | Guillou | 178/22.09 |

OTHER PUBLICATIONS

IBM Tech. Disclosure Bull., vol. 22, No. 2 (7/79) S 9186 0290, Lennon et al., pp. 643–646.

Tuchman, "Integrated System Design" in NBS Special Publication 500-27, pp. 94–96, Feb. 15, 1978.

*Primary Examiner*—Sal Cangialosi
*Attorney, Agent, or Firm*—Seed and Berry

[57] ABSTRACT

An integrated circuit decoder for providing microcomputer users with access to several proprietary programs selected from a large group of such programs that have been distributed to users in cipher. The decoder chip can decipher a program if an enciphered key called a "permit code" is presented to the decoder chip. Permit codes are not interchangeable between decoders, are issued only to customers that have paid for use of a program product, and each code will work only with one program. As the program is being deciphered in a user's microcomputer, the decoder chip places random errors into the program which make copies of the program malfunction in other microcomputers. The decoder chip keeps a table of addresses where it has placed errors and dynamically corrects the errors on the data bus whenever an error word is addressed during execution. Using such a decoder, thousands of individually priced proprietary software products can be delivered securely to prospective customers in advance of sales on laserdiscs, diskettes, TV-cables, and digital radio broadcasts.

17 Claims, 1 Drawing Figure

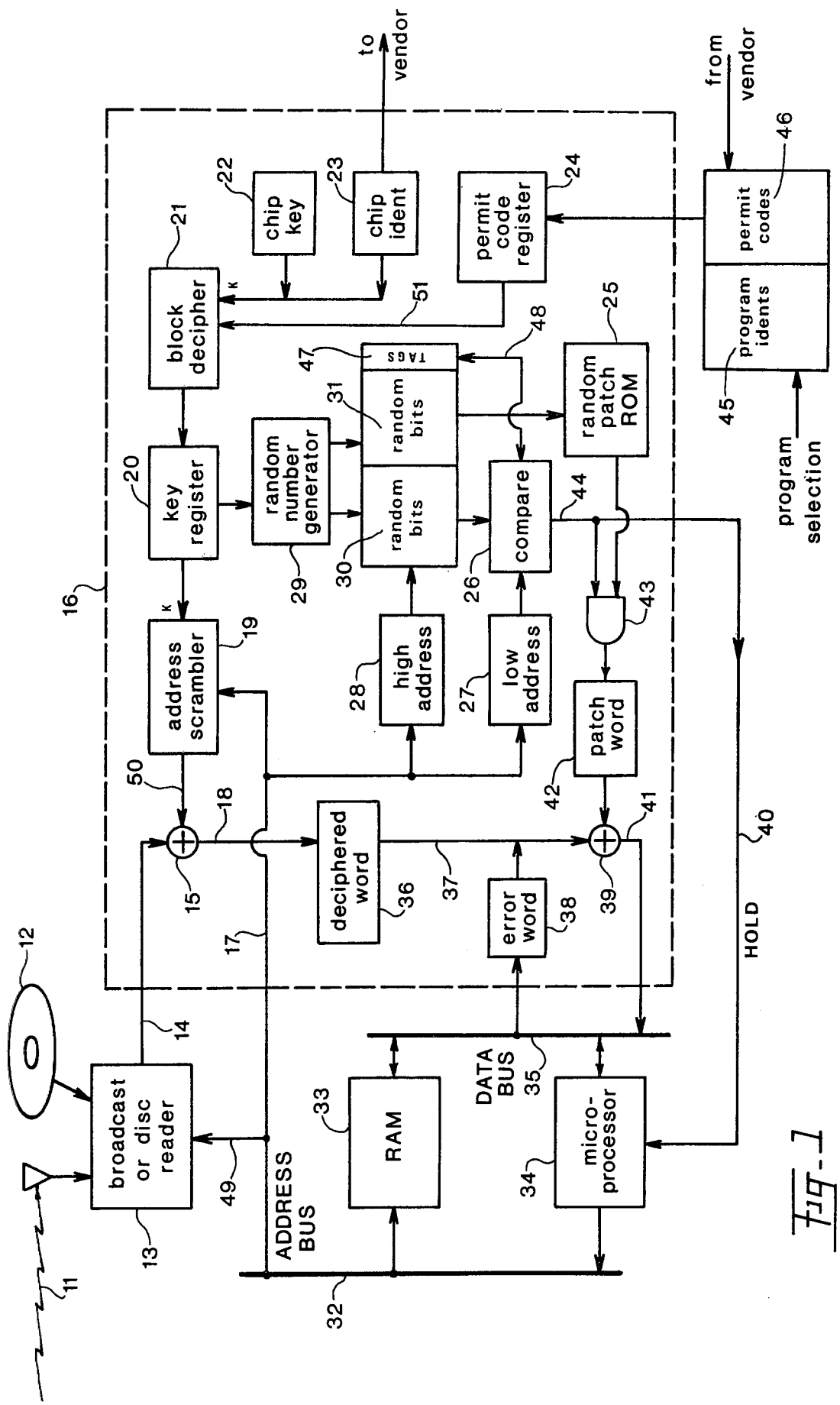

CRYPTOGRAPHIC DECODER FOR COMPUTER PROGRAMS

BACKGROUND OF THE INVENTION

This invention relates to cryptographic devices, integrated circuits, error correction, and prevention of unauthorized use of proprietary information.

Delivery of proprietary programs and/or data files (broadly termed "software") to thousands of microcomputer users is generally done in one of three ways: (1) The software can be bundled with more costly hardware and sold to each customer as a combined system. (2) The software can be sold as separately-priced packages, each package including an information storage medium such as magnetic tape, diskette, laserdisc, or semiconductor memory. (3) The software can be distributed to each customer's microcomputer from a central computer via telephone wires, TV-cable, or radio broadcast in response to a customer's order for a specific product or on a subscription basis.

Software publishers naturally expect to be paid for the software they market and want to be able to refuse delivery to non-paying users. Hence, merchandising of software as separately-priced physical packages is widely used, but broadcasting of software has been slow in arriving. The essential problem is how to insure that customers pay for what they use.

Software can be distributed in cipher via discs or broadcasts and deciphered in crypto-microprocessor chips as described in my U.S. Pat. No. 4,278,837 or in decoder chips that are used with conventional microprocessors. Vendors of software can insure payment by selling cartridges containing such chips only to paying customers.

If the software product is a unified database such as an encyclopedia or a system of programs such as an accounting system, each customer can use and pay for the whole product and each decoder cartridge can therefore be sold for one price. But if the software consists of thousands of programs and databases of which only a small percentage will be useful to any one customer, then a problem arises of how to maintain independent pricing of individual programs and databases so that a customer is obliged to pay only for what he wants and is denied use of the remaining software that he has not paid for.

Marketing a different decoder for every possible combination of thousands of individually-priced software products is clearly impractical. Requiring a separate decoder chip for each selected product becomes cumbersome and costly if more than a few programs are selected. Marketing of decoders which give each user access to a small number of equally-priced software selections (like a coin-operated jukebox) is unattractive because programs and databases vary greatly in quality, cost, and user demand. Software vendors may want to price their products differently. It would also be undesirable for a user to be able to buy a decoder for the lowest-priced selection and then use it to gain access to high-priced selections. The system should also be resistant to code breaking and piracy attacks and to contributory piracy by vendors of unauthorized decoders. The encryption keys should remain secret whatever the encryption method.

Another problem is how to avoid storing a long table of keys in the decoder chip, one key for every possible selection. If keys are not stored in the chip, there is the problem of preventing users from making copies of the keys. There is also the problem of providing new keys to each user's system whenever a user wants to pay for a new selection, without disclosing the keys to numerous people. It is also desirable for a decoder chip to operate with many different kinds of microprocessors without any requirement that the software be rewritten or revised by a programmer. The system should also permit users to make as many archival and backup copies of the protected software as needed.

The invention described herein makes it possible for software publishers to securely distribute thousands of proprietary software products in cipher on a common laserdisc or broadcast channel, while avoiding the problems described above.

OBJECTS OF THE INVENTION

Some of the objects of this invention are:

to permit delivery of thousands of programs and databases on laserdiscs or broadcast channels in advance of sales, while insuring that customers can use only what they have paid for;

to be compatable with separate pricing of software products without requiring a separate decoder for every product or combination of products.

to deter copying of programs by people who have access to the wiring of the computers in which the programs are executed;

SUMMARY OF THE INVENTION

A cryptographic decoder in a microcomputer system that selects programs from a large group of enciphered programs and deciphers only the programs that have been authorized for execution. Execution is authorized by "permit codes" which are enciphered keys. A selected permit-code is deciphered securely in the decoder chip to produce a key for deciphering the corresponding program. The permit codes are enciphered differently for each unit so that they will not work in other units and can be disclosed to microcomputer users when payment is made for selected proprietary programs or databases. Keys are not disclosed to anyone and can be derived from permit codes only inside the decoder chip under control of secret chip keys. The decoder chip deciphers permit codes using a product block encryption method, and uses a polyaphalbetic method for deciphering programs and data. The decoder chip introduces random errors into the deciphered program as it is being deciphered to deter unauthorized copying. The decoder chip dynamically corrects these random errors on the data bus as the flawed program is executing. Users can make backup copies of the program on discs which will also work with the decoder chip.

BRIEF DESCRIPTION OF THE DRAWINGS

FIG. 1 is a block diagram of a decoder chip in a microcomputer system.

DETAILED DESCRIPTION OF THE INVENTION

Referring to FIG. 1, a block diagram is shown for one embodiment of decoder 16 (dash line) which is an integrated circuit chip for use in or with a microcomputer system in which programs are stored in conventional random-access memory (RAM) 33 and executed by conventional microprocessor 34. Programs and data are received in cipher as electromagnetic radiation 11, or from TV-cable, or read from disc 12 by disc reader 13. A program selected on line 49 for execution in microprocessor 34 is passed one word at a time in cipher on bus 14 to decoder chip 16 which deciphers and alters the program as it is being loaded into RAM 33 via data bus 35 and perhaps via other data storage media (not shown) such as magnetic disc.

In the illustrative embodiment, data bus 35 may be 16 bits with an address bus 32 of 20 bits. Other bus and word sizes and bus structures may be used. Most of the 16-bit words deciphered at XOR gates 15 are stored into RAM 33 in plain deciphered form. However, to deter unauthorized copying of the deciphered program from RAM 33, decoder 16 introduces randomly placed errors into the program(s) and/or data words as they are being deciphered and stored into RAM 33. A copy of the altered program will malfunction if executed in an unauthorized microprocessor. But in an authorized system, decoder 16 will correct the errors dynamically during program execution.

Decoder 16 introduces errors into the deciphered program by exclusive-ORing randomly selected patch words 42 to randomly selected deciphered words 36 at XOR gates 39 which effectively reencipher randomly selected instructions in the deciphered program. The patch word in register 42 is normally zero. Hence most deciphered words from register 36 pass unchanged via bus 41 and bus 35 into RAM 33. Errors are introduced by non-zero patch words 42 only at addresses specified by tables 30 and 31. Later, as the altered program in RAM 33 is being executed by microprocessor 34, decoder 16 corrects each error when needed by exclusive-ORing in gates 39 the corresponding patch word 42 to error word 38 read from RAM 33 via data bus 35. Thus XOR gates 39 effectively redecipher an instruction to unenciphered form just before it is executed.

The corrected word on bus 41 is output by decoder 16 onto data bus 35 and replaces the error word on bus 35. This error correction takes place during an additional bus cycle during which control of data bus 35 switches from RAM 35 to decoder 16. This error correction cycle is initiated whenever comparator 26 detects an address of an error word and if tag bit 47 is set. Tag bit 47 indicates that an error was introduced at the specified address during deciphering. Words addressed by tables 30 and 31 that were not deciphered via gates 15 are not altered and therefore have zero tag bits 47. Decoder 16 puts microprocessor 34 into a wait state via HOLD signal 40 which prevents microprocessor 34 from processing the error word on bus 35. Error correction takes place on data bus 35 but not in RAM 33 which still contains the errors words which deter unauthorized copying from RAM 33.

If microprocessor 34 stores a word into RAM 33 at a location specified by an address in tables 30 and 31 and tag bit 47 is set, decoder 16 likewise issues a HOLD signal on line 40. During the additional bus cycle the word on bus 35 from microprocessor 34 is loaded into register 38 and altered at gates 39 by patch word 42 before being stored into RAM 33. Alternatively, storing into RAM 33 at a tagged address may cause tag bit 47 to be reset so that the tagged address will thereafter not contain an error word.

In the illustrative embodiment, addresses on buses 32 and 17 are 20 bits. The high-order 11 bits of the address are stored into register 28. The low-order 8 bits (omitting the lowest-order bit) are stored into register 27.

Whenever a word is addressed in RAM 33 the high-order 11 bits also address a row in tables 30 and 31 and a tag bit 47. Each row in table 30 consists of a byte of 8 random bits which are compared to the low-order address bits by comparator 26. If there is a match, the deciphered word in register 36 is selected for altering and the addressed tag bit 47 is set to 1 to indicate that an altered error word is present at the specified address.

The high-order address in register 28 also addresses a row in table 31. Each row consists of 6 random bits which address one of 64 fixed patching words in read-only memory (ROM) 25. These random patches may consist mostly of zeros with one or more bits set. For example:

$$0001000000100000$$
$$0100000000000000$$
$$0010010000000000$$
$$0001000000001000$$
$$0000000010000000$$

Such patches introduce inconspicuous errors into the deciphered words so that a cursory examination of the program in RAM 33 would not reveal many obvious errors. If a copy of the deciphered program in RAM 33 is executed in an unauthorized microcomputer, the errors in this uncorrected copy are sufficient to cause unpredictable malfunctions.

A determined pirate could of course, reconstruct and correct the altered words and produce copies of working programs and also reconstruct the contents of tables 30 and 31. But, without knowledge of the keys used in register 20 a contributory pirate (i.e. someone who helps users do the pirating) cannot produce modules to simulate decoder 16 to decipher everything on user's disc 12. A strong encryption method like the Data Encryption Standard (DES) is used in boxes 19, 29, and 21 to protect the keys in volatile register 20.

KEY MANAGEMENT

Each independently-executable program that can be read by reader 13 is enciphered by a software publisher using a different encryption key. The encryption method is a polyalphabetic "scrambled address" cipher such as that described in my U.S. Pat. No. 4,278,837. A product-block encryption method such as DES is used in box 19 to scramble the address of each word or byte to be deciphered under control of a secret program key stored in register 20. The scrambled address on line 50 is exclusive-ORed in gates 15 to the addressed word on bus 14 to produce a deciphered word in register 36.

The program key in register 20 is a secret binary number which is different from each program and should be 56 bits if DES is used in box 19. The program key in register 20 is also used as "seed" by random number generator 29 to produce a series of random bits which are stored into tables 30 and 31. The same DES circuitry used in box 19 for address scrambling may be used in box 29 for generating random bits. Whenever the same key is loaded into register 20, the same random bits may be stored into tables 30 and 31. These tables specify the addresses at which errors will be introduced and which bits in the addressed word will be altered. Tag bits 47 are initialized to zero whenever tables 30 and 31 are loaded.

Keys for use in register 20 should not be stored permanently in chip 16, because users may want to select an unpredictable number of programs, a publisher may use an indefinite number of keys over the years, and publishers may decide to change the keys from time to time to deter employees from revealing them. Each selection should use a different program key.

Distribution of program keys to users can be done in cipher through the user of "permit codes" which are revealed openly to users after the user pays the corresponding fees. Permit codes are enciphered program keys plus check digits and other data that can be used by a vendor to communicate useful information to customer's systems such as commands to enable free one-day demonstrations of software.

Permit codes should be different from one unit to another. This may be accomplished by giving each decoder 16 a unique or almost unique identifier in programmable ROM (PROM) 23 which is used as part of the deciphering key by box 21 for deciphering permit codes. The chip identifier in PROM 23 is revealed to a user's system and is communicated to a vendor whenever a user wants to buy a new software product. PROM 23 may consist of fused-links and need not be absolutely unique. The identifier can be a 16-bit random number burned into chips 16 during fabrication. No records need be kept of identifiers by fabricators.

Whenever a user pays a vendor for a software product, the vendor asks the user for the chip identifier and enters the identifier into a permit code generator supplied to the vendor by the owner or publisher of the software. This permit code generator contains a securely stored copy of the program key (to be used later in register 20) and enciphers the program key and check digits under control of an encryption key consisting of the chip identifier 23 and a secret chip key 22 stored in chip 16 in PROM (discussed below). The vendor then sells the permit code to the user.

The user enters the permit code into his microcomputer system which stores it into table 46 in association with the name of the corresponding program in table 45. Tables 45 and 46 should be in non-volatile storage. When the user runs a given program, his system looks up the program name in table 45 to get the associated permit code from table 46. The system stores the permit code into register 24.

Block deciphering circuit 21 then deciphers the permit code in register 24 under control of secret chip key 22 and chip identifier 23 to produce the secret program key in register 20. Chip key 22 and chip identifier 23 may both be stored into chip 16 by the software publisher who will keep records of which chip identifier goes with which chip key. Alternatively, the fabricator of chip 16 can mask-program a secret chip key 22, in which case a mask number should be part of chip identifier 23 so that different batches of chips 16 having different chip keys 22 can be used interchangeably by the publisher. Chip key 22 may be a combination of fabricator-supplied secret bits plus fusable links set by the software publisher.

Multiple chip keys 22 may be stored in each decoder 16 so that if one chip key is comprised, the next release of software disc 12 can use a different reserve chip key 22. Users would be notified of the new permit codes to replace the ones already paid for.

Circuitry shown in FIG. 1 may be combined with circuitry disclosed in my U.S. Pat. No. 4,278,837 to produce a crypto-microprocessor that accepts permit codes to enable deciphering and execution of proprietary prgrams in the same chip.

Dummy instructions that will cause programs to malfunction may be inserted by publishers into each program before enciphering and distribution of the programs on disc 112. The addresses of these malfunctional instructions may also be distributed in cipher on the same disc 12 or broadcast 11 and deciphered and loaded into tables 30 and 31. When microprocessor 34 executes an altered program in RAM 33, comparator 26 signals a HOLD on line 40 whenever an error word is addressed during a fetch cycle. Decoder 16 then may force a null operation code (NOP) onto bus 35 to replace the error word. When microprocessor 34 resumes the fetch cycle, the operation code it fetches from bus 35 is the null code which has no effect.

Alternatively, decoder 16 can increment the address on bus 32 whenever comparator 26 detects an address of an error word during a fetch cycle. Incrementing the address on bus 32 effectively bypasses the error word in RAM 33 so that microprocessor 34 fetches the next consecutive word which is not an error word.

Although the illustrative embodiments make use of one program in RAM 33, one permit code in register 24, one key in register 20, and one set of tables 30 and 31, it will be understood that multiple programs may be stored in RAM 33 simultaneously and multiple registers 20 and 24 and tables 30 and 31 may be used. Execution may alternate among several programs in RAM 33, for example among application programs, operating systems and utility programs. It will also be understood that other encryption methods may be substituted for those described herein.

The words "byte" and "word" have been used herein in a broad sense to mean a portion of information of 8 or 16 bits or other small groups of bits such as 9 bits or 32 bits.

Although I have described the preferred embodiments of my invention with a degree of particularity, the present disclosure is made only by way of example. Equivalent embodiments which do not depart from the scope and spirit of my invention may occur to those skilled in the art in the light of this disclosure.

I claim:

1. A cryptographic apparatus for deterring unauthorized execution of computer programs of instructions, the apparatus comprising:

table means for storing a plurality of digital addresses and a corresponding plurality of multiple-bit digital words;

means for determining whether a memory address matches one of the digital addresses in said table means;

means for enciphering a plurality of instructions or portions of instructions in a selected program to produce enciphered instructions to be stored at memory locations specified by memory addresses, the enciphering being performed on an instruction or portion thereof if said determining means determines that the memory address of the instruction matches one of the digital addresses in said table means, the enciphering being a function of the digital word in said table means corresponding to the matching digital address; and means for deciphering one of said enciphered instructions whenever the instruction is fetched for execution from a memory location specified by a memory address matching one of the digital addresses in said table means, the deciphering being performed as a function of the digital word in said table means corresponding to the digital address that matches the memory address of the instruction, thereby restoring enciphered instructions to unenciphered form during execution of said selected program.

2. The apparatus of claim 1 further including microprocessor means for fetching and executing said programs of instructions.

3. A cryptographic apparatus for deterring unauthorized execution of computer programs of instructions, the apparatus comprising:

table means for storing a plurality of digital addresses and a corresponding plurality of multiple-bit digital words;

means for determining whether a memory address matches one of the digital addresses in said table means;

means for enciphering a plurality of instructions or portions of instructions in a selected program to produce enciphered instructions to be stored at memory locations specified by memory addresses, the enciphering being performed on an instruction or portion thereof if said determining means determines that the memory address of the instruction matches one of the digital addresses in said table means, the enciphering being a function of the digital word in said table means corresponding to the matching digital address; and means for deciphering one of said enciphered instructions or portion thereof whenever the instruction is fetched for execution from a memory location specified by a memory address if said determining means determines that the memory address of the fetched instruction matches one of the digital addresses in said table means, the deciphering being performed as a function of the digital word in said table means corresponding to the digital address that matches the memory address of the instruction, thereby restoring enciphered instructions to unenciphered form during execution of said selected program.

4. The apparatus of claim 3 further including microprocessor means for fetching and executing said programs of instructions.

5. A cryptographic apparatus for deterring unauthorized execution of computer programs of instructions, the apparatus comprising:

table means for storing a plurality of digital addresses, each digital address being addressable in the table means by a table address;

means for determining whether a portion of a memory address matches one of the digital addresses in said table means;

means for enciphering a plurality of instructions or portions of instructions in a selected program to produce enciphered instructions, each instruction to be stored at a memory location specified by a memory address having a first portion thereof equal to a specific table address for addressing said table means, the enciphering being performed on the instruction or portion thereof if said determining means determines that a second portion of the memory address of the instruction matches the digital address in said table means addressed by said specific table address; and means for deciphering one of said enciphered instructions whenever the instruction is fetched for execution from a memory location specified by a memory address having a first portion thereof equal to the table address that addresses in said table means a digital address that matches a second portion of the memory address of the instruction, thereby restoring enciphered instructions to unenciphered form during execution of said selected program.

6. The apparatus of claim 5 further including microprocessor means for fetching and executing said programs of instructions.

7. A cryptographic apparatus for deterring unauthorized execution of computer programs of instructions stored in enciphered form as a plurality of portions of enciphered information, the apparatus comprising:

means for deciphering portions of said enciphered information to produce deciphered instructions in a selected program;

table means for storing a plurality of digital addresses and a corresponding plurality of multiple-bit digital words;

means for determining whether a memory address matches one of the digital addresses in said table means;

means for reenciphering a plurality of said deciphered instructions or portions thereof to produce reenciphered instructions to be stored at memory locations specified by memory addresses, the reenciphering being performed on an instruction or portion thereof if said determining means determines that the memory address of the instruction matches one of the digital addresses in said table means, the reenciphering being a function of the digital word in said table means corresponding to the matching digital address; and means for redeciphering one of said reenciphered instructions whenever the instruction is fetched for execution from a memory location specified by a memory address matching one of the digital addresses in said table means, the redeciphering being performed as a function of the digital word in said table means corresponding to the digital address that matches the memory address of the instruction, thereby restoring reenciphered instructions to unenciphered form during execution of said selected program.

8. The apparatus of claim 7 further including means for deciphering an enciphered key to produce a deciphered key corresponding to said selected program, said deciphered instructions being produced as a function of said deciphered key.

9. The apparatus of claim 7 further including microprocessor means for fetching and executing said deciphered instructions.

10. A cryptographic apparatus for deterring unauthorized execution of computer programs of instructions stored in enciphered form as a plurality of portions of enciphered information, the apparatus comprising:

means for controlling deciphering of portions of said enciphered information to produce deciphered instructions in a selected program;

table means for storing a plurality of digital addresses and a corresponding plurality of multiple-bit digital words;

means for determining whether a memory address matches one of the digital addresses in said table means;

means for reenciphering a plurality of said deciphered instructions or portions thereof to produce reenciphered instructions to be stored at memory locations specified by memory addresses, the reenciphering being performed on an instruction or portion thereof if said determining means determines that the memory address of the instruction matches one of the digital addresses in said table means, the reenciphering being a function of the digital word in said table means corresponding to the matching digital address; and means for redeciphering one of said reenciphered instructions whenever the instruction is fetched for execution from a memory location specified by a memory address matching one of the digital addresses in said table means, the redeciphering being performed as a function of the digital word in said table means corresponding to the digital address that matches the memory address of the instruction, thereby restoring reenciphered instructions to unenciphered form during execution of said selected program.

11. The apparatus of claim 10 further means for controlling deciphering of an enciphered key to produce a deciphered key corresponding to said selected program, said deciphered instructions being produced as a function of said deciphered key.

12. A cryptographic apparatus for deterring unauthorized execution of computer programs of instructions stored in enciphered form as a plurality of portions of enciphered information, the apparatus comprising:

means for controlling deciphering of portions of said enciphered information to produce deciphered instructions in a selected program stored at memory locations specified by digital addresses, some of the deciphered instructions having been reenciphered;

table means for storing a plurality of digital addresses and a corresponding plurality of multiple-bit digital words;

tag means for each address in said table means indicating whether the corresponding instruction is reenciphered or not reenciphered;

means for determining whether a memory address matches one of the digital addresses in said table means; and means for redeciphering one of said reenciphered instructions whenever the instruction is fetched for execution from a memory location specified by a memory address that said determining means indicates as matching one of the digital addresses in said table means and if said tag means indicates that the instruction is reenciphered, the redeciphering being a function of the digital word in said table means corresponding to the digital address that matches the memory address of the instruction, thereby restoring reenciphered instructions to unenciphered form during execution of said selected program.

13. A cryptographic apparatus for deterring unauthorized execution of computer programs of instructions, the apparatus comprising:

means for deciphering a plurality of enciphered addresses to produce deciphered addresses specifying locations in a memory;

table means for storing a plurality of said deciphered addresses and a corresponding plurality of multiple-bit digital words;

means for determining whether a memory address matches one of the deciphered addresses in said table means;

means for enciphering a plurality of instructions or portions of instructions in a selected program to produce enciphered instructions to be stored at memory locations specified by memory addresses, the enciphering being performed on an instruction or portion thereof if said determining means determines that the memory address of the instruction matches one of the deciphered addresses in said table means, the enciphering being a function of the digital word in said table means corresponding to the matching deciphered address; and means for deciphering one of said enciphered instructions whenever the instruction is fetched for execution from a memory location specified by a memory address matching one of the deciphered addresses in said table means, the deciphering being performed as a function of the digital word in said table means corresponding to the deciphered address that matches the memory address of the instruction, thereby restoring enciphered instructions to unenciphered form during execution of said selected program.

14. A cryptographic apparatus for deterring unauthorized execution of computer programs of instructions stored in enciphered form as a plurality of portions of enciphered information, the apparatus comprising:

means for deciphering an enciphered program key as a function of a secret chip key to produce a deciphered program key corresponding to a selected program;

means for deciphering portions of said enciphered information as a function of said deciphered program key to produce deciphered instructions in said selected program;

table means for storing a plurality of digital addresses and a corresponding plurality of multiple-bit digital words;

means for determining whether a memory address matches one of the digital addresses in said table means;

means for reenciphering a plurality of said deciphered instructions or portions thereof to produce reenciphered instructions to be stored at memory locations specified by memory addresses, the reenciphering being performed on an instruction or portion thereof if said determining means determines that the memory address of the instruction matches one of the digital addresses in said table means, the reenciphering being a function of the digital word in said table means corresponding to the matching digital address; and means for redeciphering one of said reenciphered instructions whenever the instruction is fetched for execution from a memory location specified by a memory address matching one of the digital addresses in said table means, the redeciphering being performed as a function of the digital words in said table means corresponding to the digital address that matches the memory address of the instruction, thereby restoring reenciphered instructions to unenciphered form during execution of said selected program.

15. A cryptographic apparatus for deterring unauthorized execution of computer programs of instructions stored in enciphered form as a plurality of portions of enciphered information, the apparatus comprising:

means for deciphering portions of said enciphered information to produce deciphered instructions in a selected program stored at memory locations specified by digital addresses, some of the deciphered instructions being erroneous instructions;

table means for specifying the digital addresses of said erroneous instructions;

means for suppressing execution of a fetched instruction whenever the instruction is being fetched from a memory location specified by an address in said table means; and means for incrementing the digital address of said suppressed instruction to produce the address of the next sequential instruction whenever the instruction is being fetched from a memory location specified by an address in said table means, thereby bypassing said erroneous instructions during execution of the selected program.

16. The apparatus of claim 15 further including means for deciphering an enciphered key to produce a deciphered key corresponding to said selected program, said deciphered instructions being produced as a function of said deciphered key.

17. The apparatus of claim 15 further including microprocessor means for fetching and executing said deciphered instructions.

* * * * *